United States Patent [19]

Dieterich

[11] Patent Number: 4,488,278
[45] Date of Patent: Dec. 11, 1984

[54] CODING SYSTEM FOR DIGITAL AUDIO DISC RECORD

[75] Inventor: Charles B. Dieterich, Princeton, N.J.

[73] Assignee: RCA Corporation, New York, N.Y.

[21] Appl. No.: 408,785

[22] Filed: Aug. 17, 1982

[51] Int. Cl.³ .............................................. G11B 21/10
[52] U.S. Cl. ........................................ 369/50; 369/43
[58] Field of Search ............... 358/336, 340, 342, 343, 358/907, 327; 360/8, 9, 19.1, 32, 27, 53; 369/59, 48, 50, 111, 43, 44; 371/38

[56] References Cited

U.S. PATENT DOCUMENTS

| | | |
|---|---|---|
| 4,138,694 | 2/1979 | Doi et al. |
| 4,159,480 | 6/1979 | Tachi. |
| 4,224,642 | 9/1980 | Mawatari et al. ................ 360/32 |
| 4,282,551 | 8/1981 | Kanazawa et al. ............... 360/32 |
| 4,313,134 | 1/1979 | Rustman et al. |
| 4,375,101 | 2/1983 | Cerracchio ....................... 360/53 |
| 4,426,698 | 1/1984 | Pargee, Jr. ......................... 360/8 |

Primary Examiner—Donald E. McElheny, Jr.
Attorney, Agent, or Firm—E. M. Whitacre; P. J. Rasmussen; R. G. Coalter

[57] ABSTRACT

Digital audio data to be recorded in a pseudo-video format on a disc record is applied to an error check encoder that encodes each line of data with an error check code. The encoder is preset to an initial state corresponding to a recording track number prior to encoding each data line. The track number is changed periodically during recording whereby track information is conveyed by the form of the error check code without requiring additional bits of information in the data lines. Upon playback of the disc, the encoded data is applied to an error check decoder that is preset to an initial state corresponding to an expected track number. Upon decoding, errors in the recovered data are corrected and the recorded track number is recovered. The expected and recovered track numbers are compared to provide a track error correction signal whereby tracking errors may be corrected on a line-by-line basis within each pseudo-video field without need for additional bits in the recorded data.

15 Claims, 9 Drawing Figures

CODING SYSTEM FOR DIGITAL AUDIO DISC RECORD

FIELD OF THE INVENTION

This invention relates generally to audio record/reproduce systems and particularly to encoding and decoding arrangements for digital audio disc systems.

BACKGROUND OF THE INVENTION

The advantages of recording audio signals in a digital form (e.g., pulse code modulation, PCM) are well known. The bandwidth requirements of PCM recording, however, are substantially greater than that required for direct analog recording. This is due in part to the necessity for sampling the audio signal at the Nyquist rate and in part to the need for additional code bits for detection and correction of errors in the PCM code. Error correction is essential because digital systems tend to fail abruptly when errors occur in the bit stream.

The bandwidth needed for digital audio recording (e.g., 2-3 MHz) is within the capabilities of relatively inexpensive consumer or "home use" video disc and video tape systems. A digital audio signal may be made compatible with such equipment by recording it in a "pseudo-video" format, that is, one having a television-like line and field structure with simulated vertical and horizontal synchronizing signals. See, for example, U.S. Pat. No. 4,138,694 of Doi et al. Pseudo-video digital audio encoders and decoders for use with consumer and professional video tape recorders are commercially available. Examples are the Sony model PCM-1 for home use and the model PCM-1600 for professional use.

Video disc players have inherent advantages in playing back digital audio programs over video tape players, e.g., the ability to quickly access the recorded information, relatively low replication costs, relatively simple mechanical requirements, etc. This, unfortunately, is accompanied by a basic disadvantage relating to tracking errors. Specifically, tracking errors seldom occur in video tape recorders and a forward or backward skip of one track on a helical scan VTR results in only a one field error in the location of the pick-up transducer. A single skip of one track in a presently available video disc player (e.g., the RCA model SFT-100) results in an eight field error in the recovered signal. In another known player a skip of one track results in a two field error for disks recorded at a constant angular velocity.

It is known that one may correct tracking errors in a video disc player on a field-by-field basis thereby placing video disc players on a par with video tape players. An an example, in U.S. Pat. No. 4,313,134 of Rustman et al., a video disc system is disclosed wherein field numbers are recorded in pulse code modulation (PCM) form during the vertical interval of each video field. This has become known as a digital auxiliary information code (hereinafter DAXI code). Tracking errors (e.g., locked or skipped grooves or information tracks) are detected in a player by noting an improper sequence of two or more decoded DAXI field numbers. Correction of the error is provided by means of a transducer deflector (e.g., a stylus "kicker" solenoid or piezoelectric element) which radially translates the pick-up transducer in a direction to reduce the tracking error until such time as the field numbers again form an orderly sequence. The vertical blanking interval is also used in certain video tape recorder systems for conveying field identification signals (e.g., SMPTE or EBU time codes) to facilitate accurate field location for editing. See, for example, U.S. Pat. No. 4,159,480 of K. Tachi.

SUMMARY OF THE INVENTION

It is recognized herein that a need exists for correction of tracking errors in a digital audio disc system on a more frequent basis than the field-by-field basis provided in known video disc systems and without the necessity of increasing the transmission rate or recording density. This need exists because there are practical limits on the number of lines of digital audio data which may be corrected by means of burst error correction encoding of the data. It simply is not practical to add enough error correction bits to the digital audio signal to correct an entire field of data which may be lost due to a tracking error.

It is, therefore, a principle object of the invention to convey tracking information on a line-by-line basis without need for additional data bits in the PCM bit stream.

Heretofore it has been recognized generally that one may manipulate the generator polynomial initial conditions in a CRC (cyclic redundancy check) encoder to convey information as to the character of subsequently encoded PCM data fields. See, for example, U.S. Pat. No. 4,282,551 of Kanazawa et al. This, however, has heretofore required relatively complex subsequent processing (plural decoders) to sort out the recovered data.

It is, therefore, a further object of the invention to provide a new encoding format which greatly simplifies subsequent processing of encoded digital audio signals to provided line-by-line track error detection to thereby facilitate inter-field track error correction.

It is yet another object of the invention to provide a digital audio disc player having a minimum of additional circuitry over that employed in conventional video disc players for providing track error correction on a line-by-line basis of digital audio signals recorded in a pseudo-video format.

A method, according to the invention, of encoding an audio signal in a pseudo-video format to convey track information simultaneously with the audio signal on a line-by-line basis comprises the steps of digitizing the audio signal to form fields of digital data lines. Each data line is encoded in an error check encoder to form an encoded recording signal. A track identification number is generated and applied to initialize the encoder to a given initial condition prior to encoding each data line. The track identification number is incremented at predetermined intervals.

Playback apparatus, embodying the invention, for discs recorded in the aforementioned format, includes recovery means for recovering the digital data from the disc. Decoder means, responsive to each line of data provides an error corrected output signal. Initialization means places the decoder means in an initial state corresponding to an expected or "anticipated" track number prior to decoding of each data line. Means are provided for comparing the expected and recovered track numbers to effect track error correction when the numbers differ.

DETAILED DESCRIPTION

Figure 1:
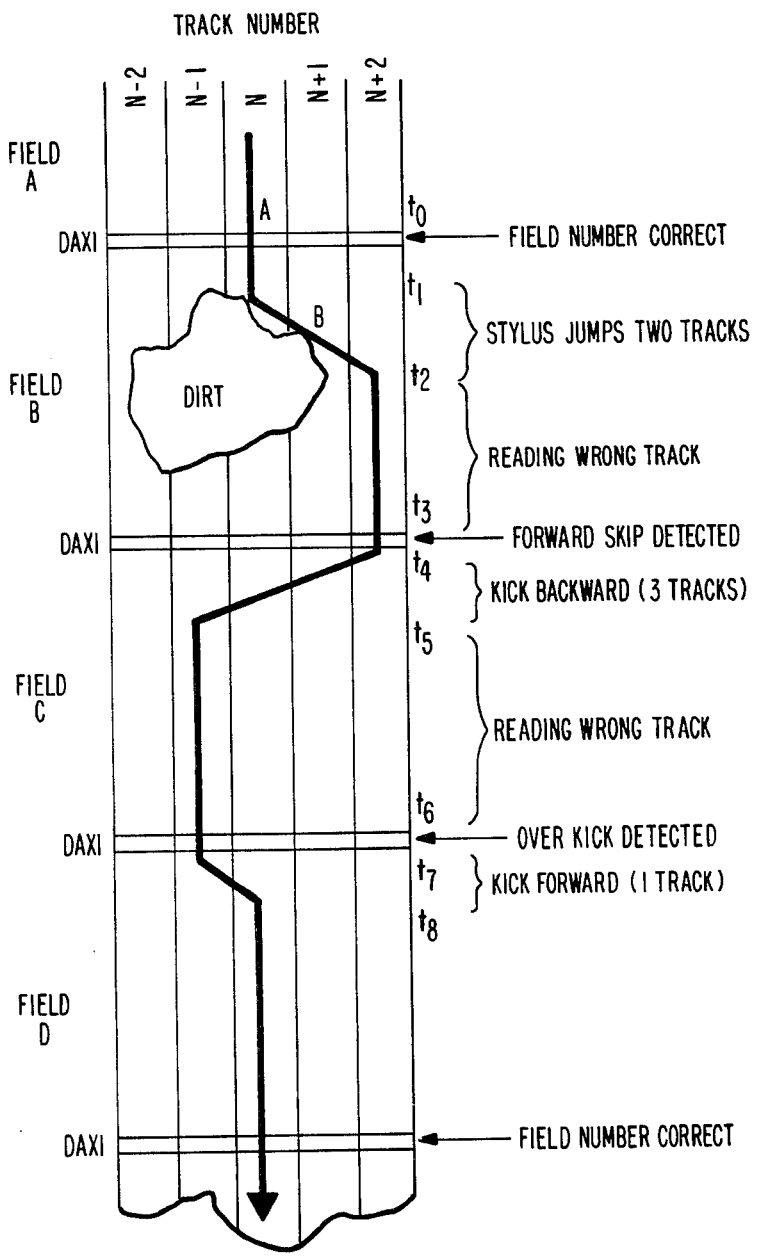
FIGS. 1 and 2 are plan views of a portion of a disc record showing the focus of travel of a pick-up stylus in a disc player having field by-field track correction (FIG. 1) and line-by-line track correction (FIG. 2)
Figure 2:
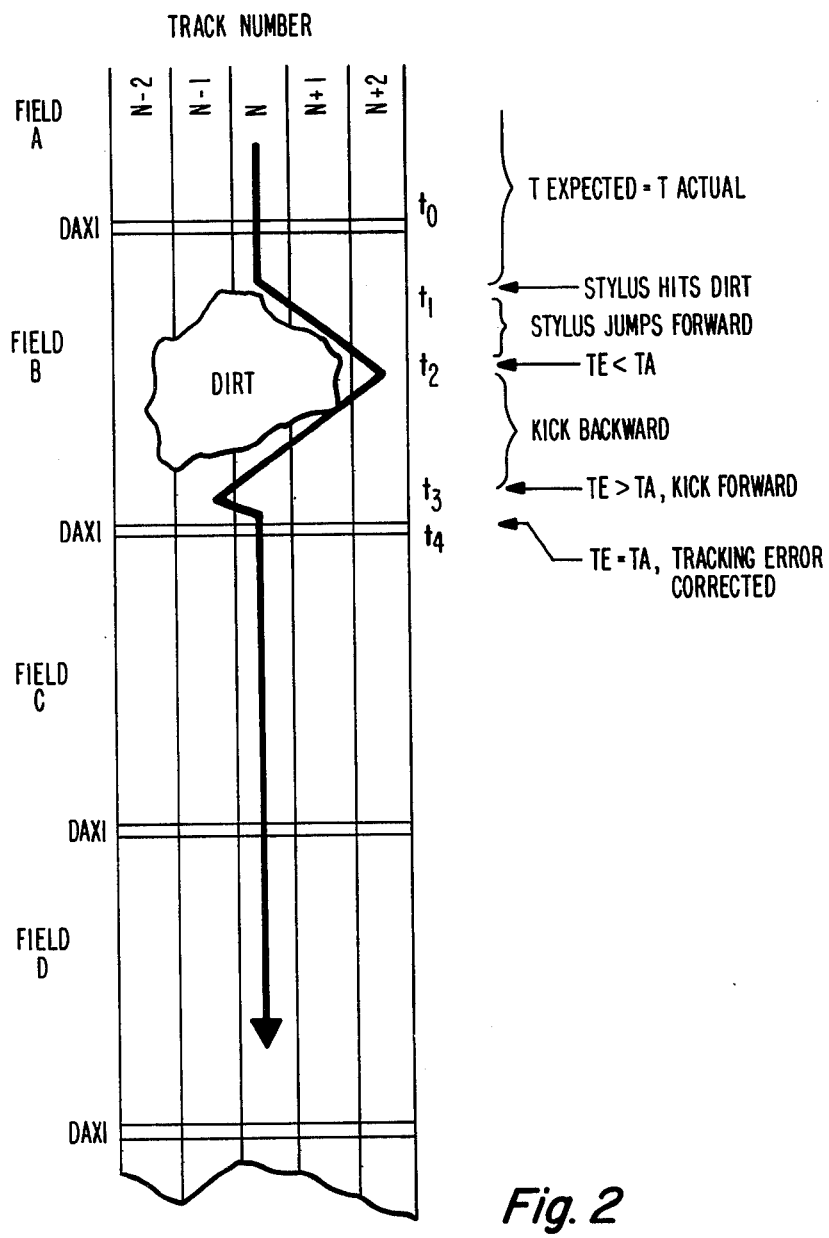

FIGS. 1 and 2 provide a comparison of a field-by-field track error correction method (FIG. 1) with the line-by-line correction method of the present invention (FIG. 2). In FIG. 1, five adjacent tracks of a disc record are shown along with the locus (path) of travel (dark arrow) of a signal recovery stylus. The term "track", as used herein, means an information conveying path on the disc and may be formed in a spiral or in concentric circles. The stylus is initially in track number N of field A at time t-0 and is lofted from the disc at time t-1 upon encountering a particle of dirt spanning tracks N-2, N-1 and N. At time t-2 the stylus lands in track number N+2 and continues in that track until the beginning of the next field (field C). Since the stylus has been radially translated by two tracks, the true tracking error amounts to a total skip of sixteen fields in a disc system where there are eight fields per disc convolution.

To correct the tracking error, the DAXI field number code recovered in the vertical interval of field B is compared with the code for field C which is recovered at time t-3. A kick pulse is applied to the stylus at time t-4 which, for illustrative purposes, results in an overkick in the internal t-4 to t-5 to track number N-1. The overkick is corrected in a similar fashion in field D until the stylus is again tracking the correct track N.

As seen, in this hypothetical example, the total time lost during track error correction amounts to about two fields. Even if the overkick had not occurred in field C, the amount of data lost would amount to about one field which would require a relatively complex code to facilitate error correction. It is desirable to reduce the coding requirements and thus simplify the code processing circuits thereby reducing cost and improving reliability.

FIG. 2 illustrates the improvement which may be obtained when track error correction is provided on a line-by-line basis using information specially encoded in each horizontal data line. As shown, the two corrections for traversing the dirt particle are accomplished well within the time frame of one field. For purposes of illustration, the size of the dirt particle is greatly exaggerated. In practice most disc defects are quite small relative to the physical dimension (length) of one field and so corrections may be made within a few lines and, in most cases, within the capability for error detection and correction of practical CRC codes. Where the code limits are exceeded, standard error concealment techniques (e.g., first or second order interpolation, etc.) may be used to minimize undesirable effects of the data interruption. It should be noted from FIG. 1, however, that even a small defect in a disc with field-by-field track error correction can nevertheless result in a track error approaching one entire field in length. Correction is not possible in such a case and concealment is less effective.

Figure 3:
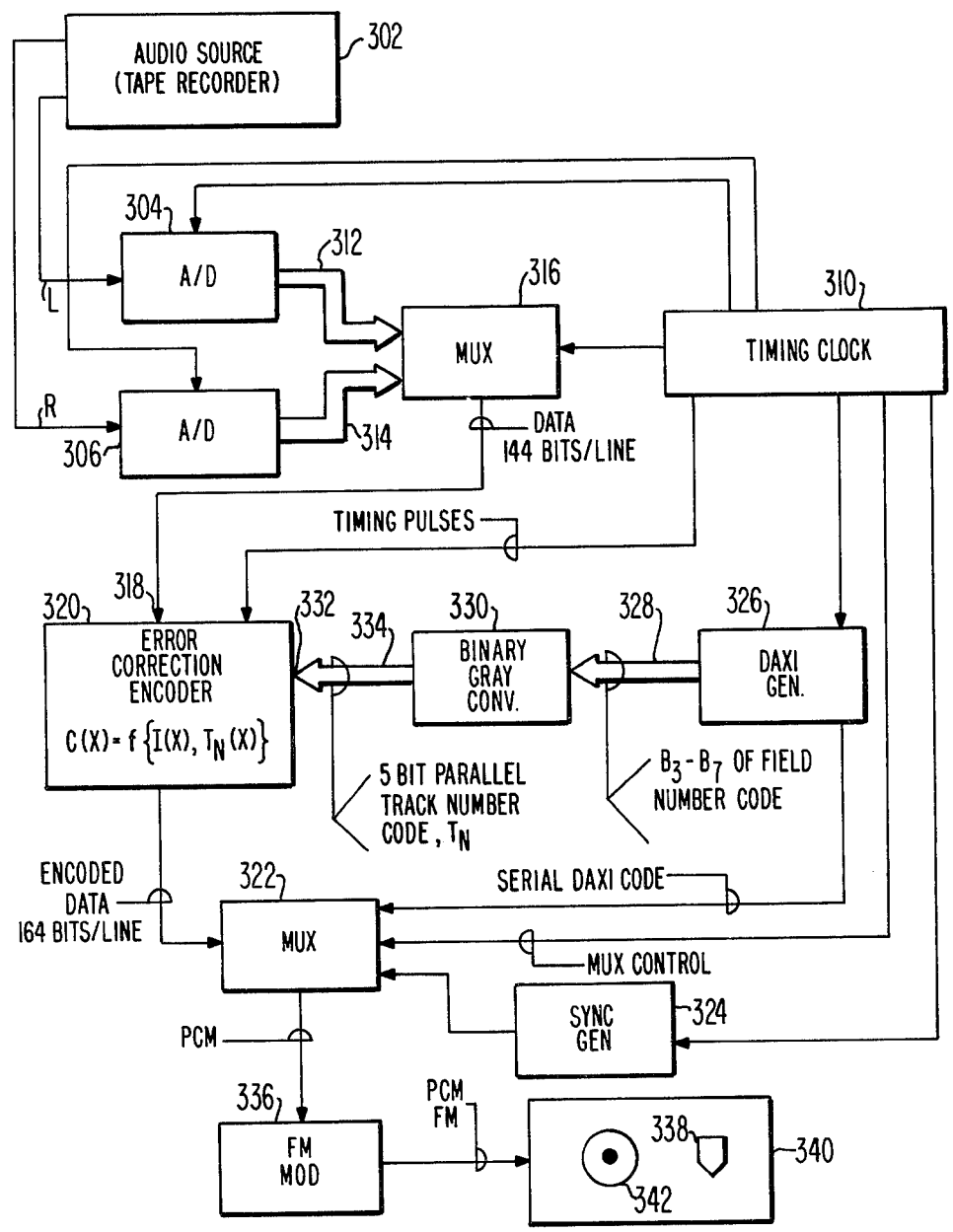
FIG. 3 is a block diagram of a digital audio disc recording system embodying the invention.

The recording system of FIG. 3 includes an audio signal source 302 (e.g., a tape recorder) coupled to supply left (L) and right (R) baseband audio signals to respective inputs of analog-to-digital (A/D) converters 304 and 306 which receive conversion timing (clock) signals from a timing clock unit 310. The digitized L and R audio signals are supplied in bit parallel form via respective data buses to the input of a data multiplexer (MUX) 316 that is synchronized with the A/D converters by means of timing signals produced by timing clock unit 310. Multiplexer 316 interleaves the L and R data bits to form lines of serial PCM data at a standard TV horizontal line rate (for "real time" recording) or a submultiple thereof (e.g., half the standard rate for mastering at one half the real time rate).

Half rate recording is preferred to reduce the cutterhead bandwidth requirements where the disc is recorded using electromechanical cutting techniques. In half-rate recording the tape recorder is run at half speed, all processing is timed at half the normal (real time) rate and the mastering turntable is run at half speed whereby full bandwidth master recordings may be made with a cutterhead of lesser bandwidth. See, for example, U.S. Pat. No. 4,044,379 of J. B. Halter.

For purposes of illustration it will be assumed that converters 304 and 306 each have 16 bit resolution, that three conversions per line are performed (i.e., the audio is sampled three times during a standard TV line interval) and that multiplexer 316 includes a parity check generator that adds one parity check bit to each pair of interleaved audio bits. These choices result in a serial digital audio "information" signal having 144 bits per line. A coding system employing such a format is described in detail in U.S. patent application Ser. No. 311,259 filed Oct. 14, 1981, by C. B. Dieterich and entitled "CODING SYSTEM FOR RECORDED DIGITAL AUDIO". The information signal is applied to a serial input 318 of an error correction encoder 320 which encodes the information signal with an additional 20 bits to provide a burst error correction encoded data signal having a length of 164 bits per line. Suitable burst error correction encoders are described in the textbook by Peterson entitled "ERROR CORRECTING CODES" published by the M.I.T. press in 1961. See particularly, Chapter 10 entitled "CYCLIC CODES FOR BURST ERROR CORRECTION" pp. 183–200. See also, the textbook "ERROR-CORRECTION CODING FOR DIGITAL COMMUNICATIONS" by G. C. Clark Jr. and J. B. Cain published in 1981 by Plenum Press. Specific encoders are described herein subsequently.

The burst error correction encoded data signal is applied to an input of an additional multiplexer 322 where it is combined with line and field synchronizing signal produced by a sync signal generator 324 and with a DAXI field identification code produced during a selected line (e.g., line 17) of the vertical interval by a DAXI code generator 326. The DAXI code is not necessary to the present invention but provides a convenient means of conveying highly accurate framing information (e.g., a lengthy Barker code) and complete (e.g., 18 bit) field identification numbers. The complete field numbers may be used in a digital audio disc player for calculating playing time by dividing the numbers by an appropriate constant. A suitable DAXI code generator and code format is described in U.S. Pat. No.

4,308,557 of C. B. Dieterich entitled "VIDEO DISC SYSTEM" which issued Dec. 29, 1981. Timing and control signals for multiplexer 322, sync generator 324 and DAXI generator 326 are provided by timing clock unit 310.

In addition to providing the functions noted above, the DAXI code is used in this embodiment of the invention as a source of track numbers to be conveyed by the format of the encoded data signal during each line thereof. It is assumed, for purposes of illustration, that a disc is to be recorded with eight fields per track or disc convolution. Under this assumption, the least significant three bits of the DAXI code (B-0, B-1 and B-2) uniquely identifies each of the eight "sectors" (fields) recorded on the disc. The higher ordered bits (bit B-3 and above) uniquely identifies each track (or groove) convolution.

It is recognized herein that it is not necessary for purposes of line-by-line track error correction to encode a unique track number with each data line. The complete track number corresonds to the higher ordered 15 bits of the DAXI field identification code and it is both unnecessary and impractical to burden encoder 320 with so many bits when only a selected few will do for all practical track errors. It has been found that a partial track number rather than the comlete track number is fully adequate to uniquely specify all potential track errors on a disc record. This is based on the observation that the vast majority of track errors in conventional video disc players comprises skips of fewer than 10 grooves or so. A skip of a large number of grooves (e.g., 1000) cannot occur in a player where the compliant range of the signal recovery transducer is a lesser number.

Accordingly, in this example of the invention, provision is made for uniquely specifying only enough track numbers to accomodate track errors of plus or minus 15 grooves. A five bit groove number (32 possible states) is adequate for this purpose and is obtained from bits B-3 through B-7 of the DAXI field identification number produced by generator 326.

The five bit partial track number produced by generator 326 is applied in parallel form via bus 328 to the input of a binary-to-Gray code converter 330 which supplies the partial track number in Gray code form to a parallel input 332 of encoder 320 via a data bus 334. The coversion to Gray code is not essential to the invention but provides an advantage in that only one bit transition occurs for each increment or decrement of the track number. This lessens the probability of decoding errors when tracking errors and signal (data) errors occur concurrently.

Input 332 of encoder 320 controls the initial state of the encoder prior to processing of the 144 bit data input signal. In conventional encoders the initial state is constant (e.g., all zeros or a pre-set number other than zero) so that a given input data stream will always produce a unique coded output data stream. An exception to this is where the generator polynomial is altered depending on whether the input data represents control or audio information as shown in the previously mentioned Kanazawa patent (U.S. No. Pat. 4,282,551). In the present invention, the initial state of the encoder does not depend on the character of the input PCM data stream but rather on the partial track number. Adding track numbers to the audio line data in this way does not add any additional data bits to the encoded data but rather, results in a modification of the encoding form. Thus, in the present invention, a given input data stream results in different encoded data representations depending on the track number.

A further feature of the encoding method of the invention is that decoding requires only a single decoding circuit (rather than a plurality of separate decodes for each possible code format). This results because the initial conditions of the burst error encoder 320 represent a number which may be readily predicted in either of two ways in a digital audio disc player. One way is to base a prediction on the basis of the recovered partial track numbers. When two or more track numbers agree, the agreed value is most probably correct and may be used to predict the next expected or anticipated value. These techniques are discussed in more detail subsequently in connection with digital audio players embodying the invention.

The resultant signal produced by multiplexer 322 is applied to the input of a frequency modulator 336 which supplies a pulse code modulated FM recording signal of "pseudo-video" format to the cutterhead 338 of a disc mastering lathe 340. The lathe includes a turntable for rotating a master substrate 342 as the groove is cut which, preferably, is done at half the intended playback rate for the reasons previously mentioned. Electromechanical recording in a metal master substrate is discussed in detail in the previously mentioned Halter patent. In the alternative, the recording may be done with well known optical, EBR or laser recording techniques. After recording, the finished master substrate may be replicated to provide positive image vinyl disc copies by matrixing and pressing methods well known in the art.

Figure 4:
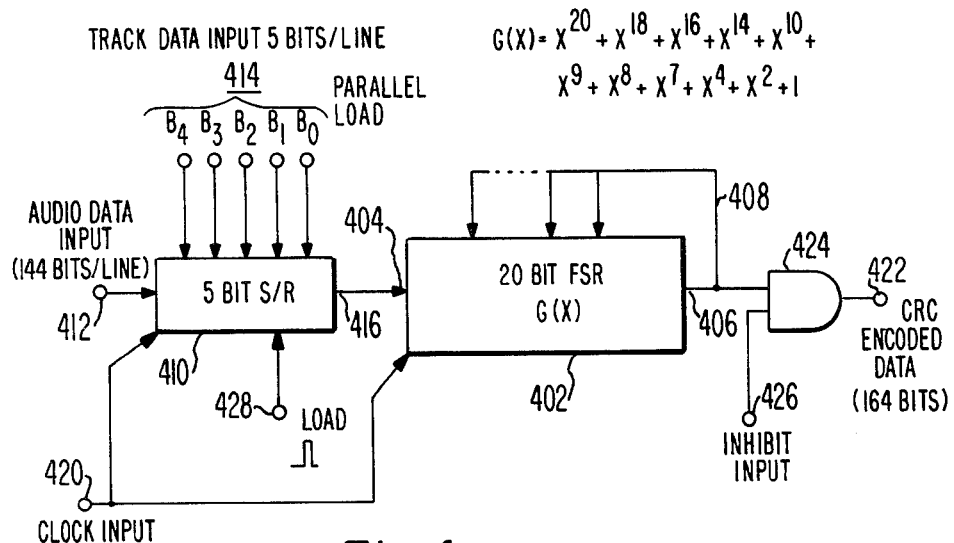
FIGS. 4 and 5 are block diagrams illustrating alternative forms of encoders suitable for use in the recording system of FIG. 3.

FIG. 4 is exemplary of an encoder suitable for use as encoder 320 in FIG. 3. The encoder comprises a 20 bit feedback shift register (FSR) 402 having an input 404 for receiving serial input data and an output 406 for providing burst error encoded serial output data. Output 406 is coupled via a feedback path 408 to eight stages of the register to form a generator polynomial G(x) noted in the figure. FSR burst error correction encoders and other exemplary generator polynomials are described ih detail in the aforementioned textbooks. What is of particular importance to the present invention is the manner in which the encoder is initialized, not its specific structure or its generator polynomial.

Initialization of the encoder is provided by a 5 bit shift register 410 having an input terminal 412 for receiving the serial digital audio data line (144 bits/line), a parallel input 414 for receiving bits B-0 through B-4 of the five bit Gray code of converter 330 and an output 416 for providing serial output data to input 404 of FSR 402. A terminal 420 is provided for receiving clock pulses from timing unit 310 and coupling the pulses (169/line) to the shift inputs of register 410 and FSR 402. Terminal 406 is coupled to the encoder output terminal 422 via an AND gate 424 controlled by inhibit pulses and load pulses applied to register 410 at terminals 426 and 428, respectively, are produced by timing unit. 310.

In operation, FSR 402 is initially cleared and the 5 bit Gray code representing a partial track number is applied to parallel input terminals of register 410 at the start of each digital audio line and latched into the register in response to the load pulse. Then the inhibit pulse (active low) is applied to terminal 426 to disable gate 424 as 5 of 169 clock pulses are applied to terminal 420 thereby shifting the track number code into FSR 402 while disabling its output signal. At the same time 5 bits of the digital audio data are shifted into register 410. Accordingly, at the end of the 5th clock pulse, FSR is in an initial state corresponding to the partial track code and register 410 contains the first 5 bits of the audio data. With the encoder thus initialized, gate 424 is enabled and the remaining 164 clock pulses are applied to terminal 420. This causes the 144 bits of audio data to be encoded as a 164 bit burst error correcting code (there are 20 more shift pulses applied to FSR 402 than data bits in the audio code).

In functional terms, register 410 provides parallel-to-serial conversion of the track numbers to serially precondition FSR 402 at the beginning of each data line while gate 424 inhibits the encoder output during the preconditioning process.

Figure 5:
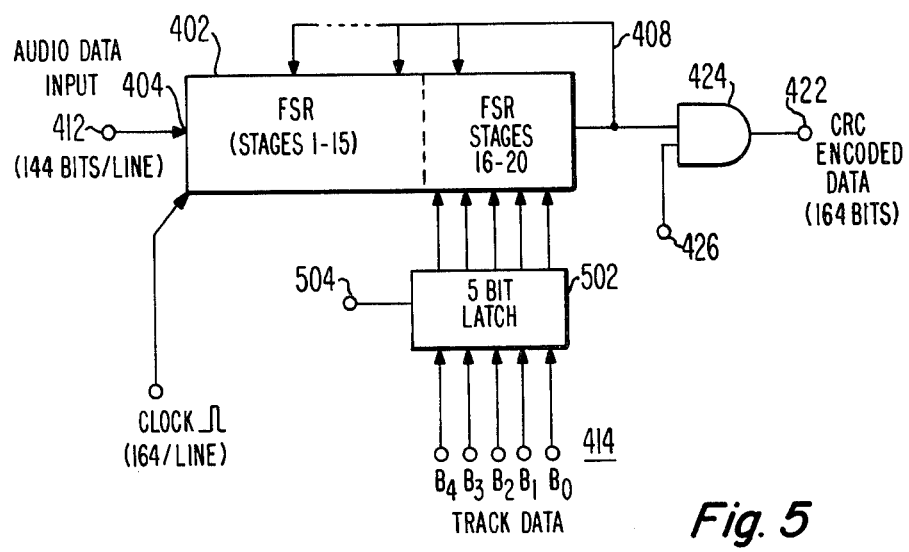

FIG. 5 illustrates a modification of the encoder of FIG. 4 in which track data is entered into FSR 402 in parallel form rather than serial form. Shift register 410 is omitted and terminal 412 is connected directly to the input of FSR 402. The track data terminals 414 are coupled to states 16–20 of FSR 402 via a 5 bit latch 502. Latch 502 is enabled at the start of each new data line by means of a latch enable pulse applied to terminal 504. The track data is added to the last 5 register stages, the FSR is clocked 5 times and then the audio data is clocked into the shift register (144 bits) which receives an additional 20 clock pulses to produce a burst error encoded digital output signal at terminal 422 of 164 bits/line. Gate 424, as in FIG. 4, suppresses the encoder output signal during the track data loading process.

Figure 6:
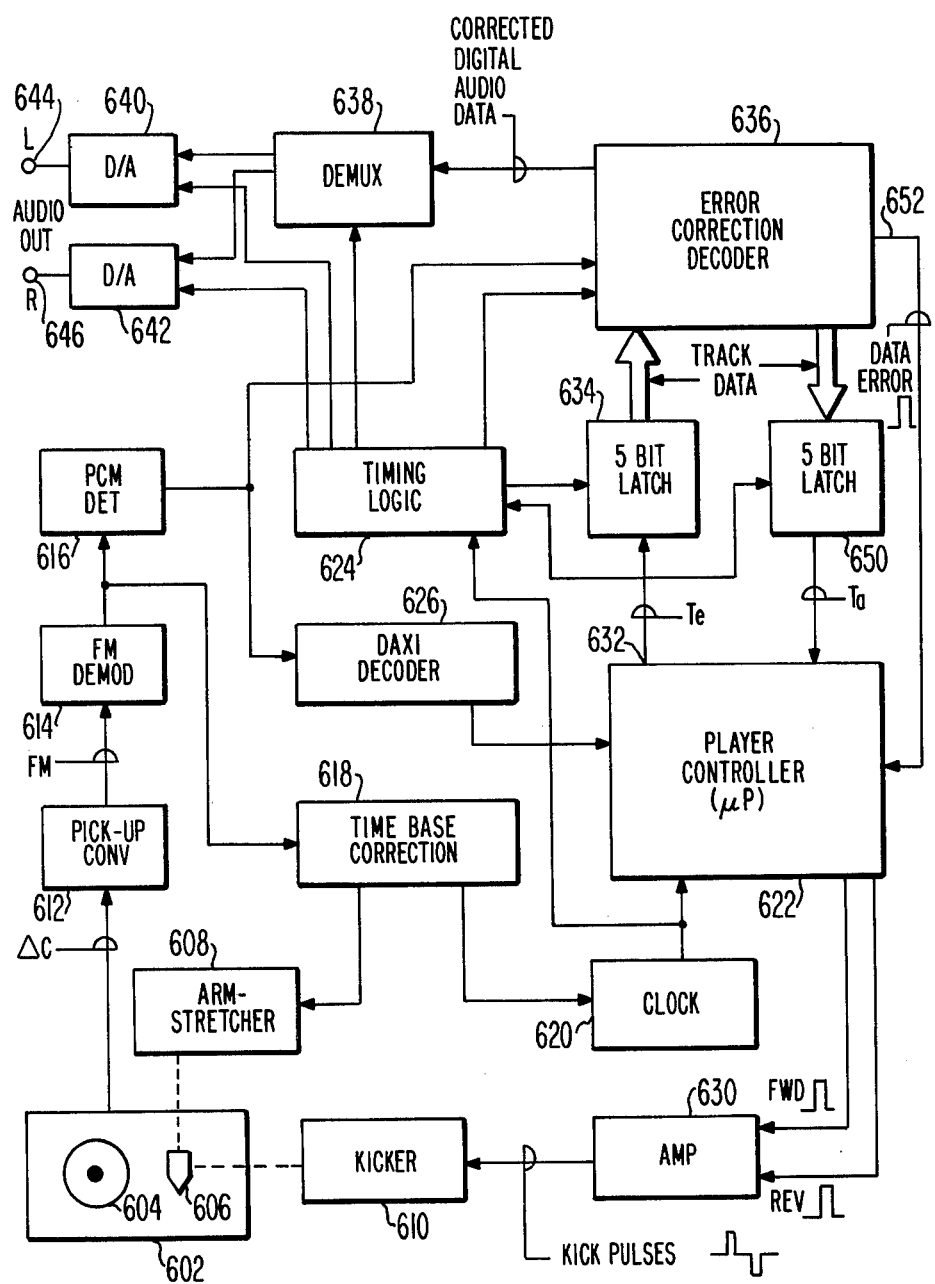
FIG. 6 is a block diagram of a digital audio disc player embodying the invention.

The digital audio disc layer of FIG. 6 comprises a turntable unit 602 for rotating a disc record 604 recorded as hereinbefore described and a pick-up transducer 606 for recovering information signal from the disc. Time base errors in the recovered signal are corrected by means of an "arm-stretcher" transducer 608 coupled to effect tangential translation of transducer 608 in response to a time base correction signal. Tracking errors are corrected by means of a "kicker" transducer 610 (e.g., a solenoid or piezoelectric element) coupled to effect radial translation of tranducer 606 in response to kick pulses supplied thereto.

It will be assumed that information is stored in disc 604 in the form of topological variations and recovered by sensing capacitance variations between a stylus in transducer 606 and the disc topology. The disc may be of the grooved or groove-less type, both being well known disc forms. The capacitance variations sensed by the stylus are converted to provide an FM output signal via a pick-up converter 612. The FM signal is demodulated in a demodulator 614 and applied to the inputs of a PCM detector 616 and a time-base correction servo unit 618. Unit 618 includes a phase lock loop which detects errors in the "color" synchronizing component of the recovered "pseudo-video" signal and supplies a time base correction signal to arm-stretcher transducer 608 in a sense to reduce the error. Unit 618 also controls a clock 620 which regulates the timing of the player controller 622 (preferably, a micro-processor although it may be implemented with conventional discrete logic circuits) and regulates the timing of a timing logic circuit 624 that controls the player audio processing circuits. By this means, essentially all significant clock and timing signals in the player are locked to a common frequency. Details of a suitable time base correction unit are described, for example, in U.S. Pat. Nos. 4,286,282 of Christopher et al., and 4,247,866 of Wilber et al. Various forms of stylus kickers are described in U.S. Pat. Nos. 3,993,863 (Leedom), 4,258,233 (Simshauser) and 4,183,059 (Palmer).

PCM detector 616 may be of the type described in U.S. Pat. Nos. 4,278,992 of T. J. Christopher or 4,275,416 of C. B. Dieterich and provides the function of detecting the PCM data contained in the FM signal. The PCM data is applied to a DAXI decoder (626) which detects and corrects errors in the DAXI code and sends the recovered information (including complete 18 bit field numbers) to the player controller 622 which, in turn, provides supervisory control of various player functions such as motor control, stylus lift control, kick pulse generation, etc. Decoder 626 and controller (microprocessor) 622 may be of the general kind described in U.S. Pat. No. 4,308,557 (Dieterich). See also, U.S. Pat. Nos. 4,309,721 (Christopher), 4,307,418 (Mindel et al.) and 4,313,134 (Rustman et al.).

Forward and reverse kick pulses are produced by controller 622 by comparing the actual track number recovered from the disc with an anticipated or expected track number. If the actual track number is less than expected, forward kick pulses are applied to kicker 610 via amplifier 630 on a line-by-line basis until the numbers agree. Kick pulses are applied in the opposite direction if the actual groove number is greater than expected. The operation is illustrated in FIG. 2.

The expected or "anticipated" track identification number may be obtained from bits B3–B7 of the field identification code produced by the DAXI decoder and supplied to controller 622. Controller 622 has a serial output port 632 which supplies the expected track number (hereinafter, Te) to a 5 bit latch which holds the track identification number Te in parallel form from track to track. Every eight fields, the expected track number is updated (assuming eight pseudo-video fields per disc convolution).

As previously mentioned, the expected track number Te may be generated in controller 622 by comparing actual track numbers recovered from the line data (hereinafter, Ta). If two (or more) sequential numbers agree, the number may be stored in controller 622 and incremented by one for every eight fields received to generate Te. There are thus two reliable ways in which it is known before each data line is received what the most probable recovered track number will be.

The actual track number Ta is recovered on a line-by-line basis (together with burst error correction of the digital audio data lines) by means of an error correction decoder 636 having a serial input for receiving the encoded digital audio PCM data and a parallel input coupled to the output of latch 634 for receiving the estimated track number Te. At the start of every line of encoded audio data (164 bits/line) decoder 636 is initialized or preset with the 5 bit estimated track number Te. The audio data line is then shifted into the decoder which detects errors, if any, corrects the errors, if necessary, and provides a 144 bit serial decoded and corrected line of audio data to de-multiplexer 638. As in encoding, the de-multiplexer may include a parity check circuit for further correction of errors as described in the aforementioned Dieterich patent application. After de-multiplexing, the separated digital audio signals are applied to respective digital-to-analog converters 640 and 642 which supply respective baseband left L and right R audio signals to audio output terminals 644 and 646, respectively.

Recovery of track number Ta occurs subsequent to the loading of the Te and audio data into decoder 636.

The remainder left in the decoder after all audio data shifts are completed corresponds to the originally recorded track number Tn if no error has occurred in the data line. The remainder is stored in another 5 bit latch 650 for application to a serial input port of controller 622. If no error is present in the data line, Ta is assumed to be valid and is transferred to controller 622 for comparison with the estimated track number Te. If Te and Ta differ, kicker 610 is activated as previously described to correct the tracking error.

As a safeguard against processing of the recovered track number Ta when errors are likely, decoder 636 includes an error detector which supplies an error signal to controller 622 via conductor 652 whenever it appears likely that Ta may be in error. The error signal when present interrupts processing of the Ta data and no kick pulses are supplied to kicker 610. The normal process of comparing Te and Ta to generate kick pulses (when needed) resumes when the error signal is absent.

Figure 7:
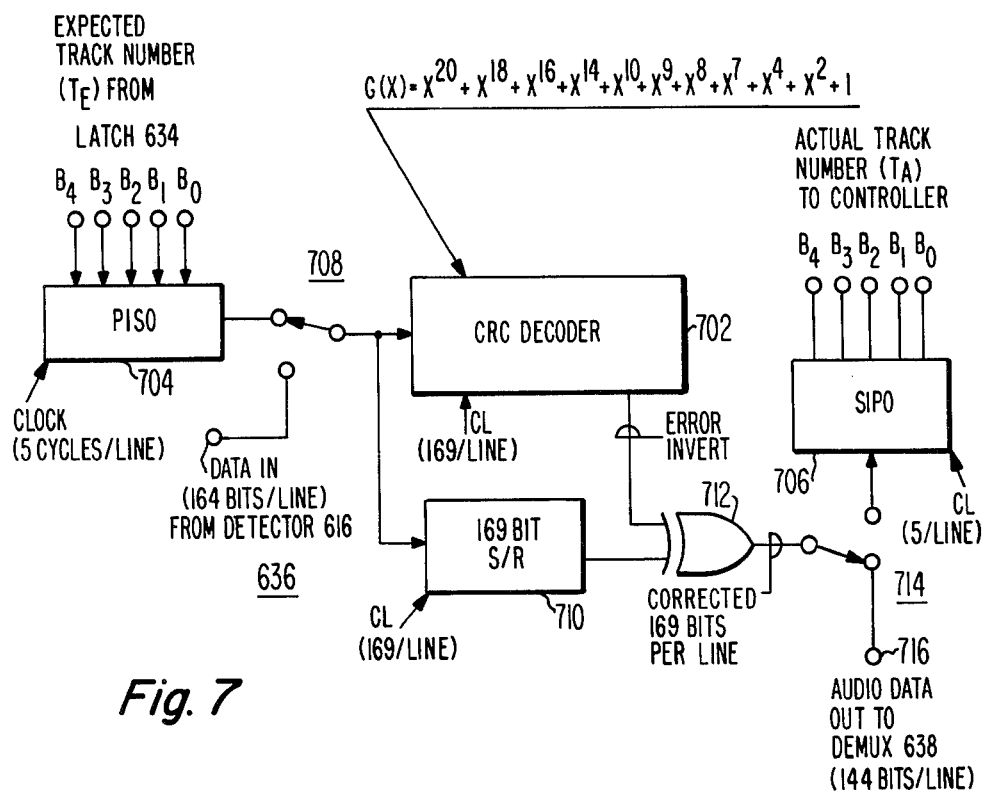
FIGS. 7 and 8 are block diagrams illustrating alternative forms of decoders suitable for use in the player of FIG. 6.

FIG. 7 illustrated details of error correction decoder 636 with an advantageous arrangement for entering Te data and recovering Ta data from a CRC error correction decoder 702 and which does not require direct access to the decoder stages. Decoder 702 may be of the polynomial kind described by Peterson or by Clark and Cain in the aforementioned textbooks and is assumed to have the same generator polynomial G(x) assumed in the examples of the encoder and indicated in the figure. The Te data is applied to input terminals B0-B4 of a 5 bit parallel-in serial-out register (PISO) 704 and the Ta data is obtained from the output terminals B0-B4 of a 5 bit serial-in parallel-out register (SIPO) 706.

The output of PISO 704 (5 bits/line) is time-division multiplexed to preceed the recovered encoded data (164 bits/line) and applied to the input of decoder 702 and to the input of a 169 bit delay shift register 710 via a multiplex switch 708 (shown schematically) thereby forming a 169 bit serial input signal during each line. Errors in the 169 bit data line are corrected by means of an error invert signal produced by decoder 702 which is exclusive OR'ed with the delayed data provided by register 710 in an exclusive OR gate 712. The corrected data produced at the output of gate 712 is demultiplexed by means of switch 714 which "steers" the first 5 bits of SIPO 706 and the remaining 164 bits to an output terminal 716 during each data line. The output data is then applied to de-multiplexer 638 for separation of the L and R audio data bits and subsequent digital to analog conversion to baseband form in converters 640 and 642.

Figure 8:
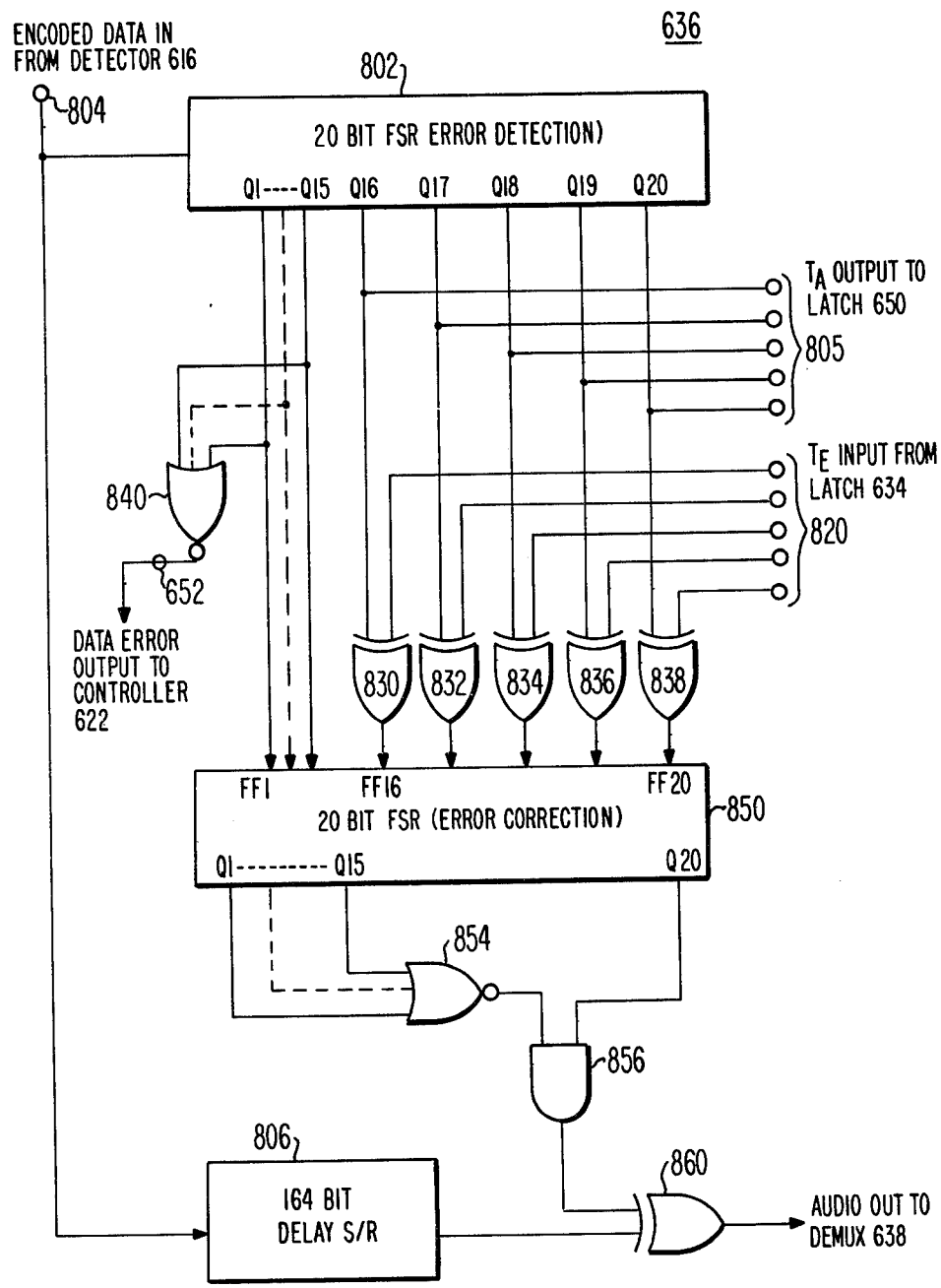

FIG. 8 illustrates an alternative form which error correction decoder 636 may take for providing parallel entry and recovery of the Te and Ta data and details of error identification and correction. The decoder comprises a 20 bit feedback shift register (FSR) 802 which has the same generator polynomial used in recording (the generator polynomial uniquely specificies the register feedback connections). The encoded data (at terminal 804) is shifted into register 802 and into a delay shift register 806 (164 bit) during each data line.

At the end of each "horizontal line" of the audio data signal, the state of the 20 flip flops (Q1-Q2 outputs) of FSR 802 represents what is referred to in the aforementioned textbooks as the "syndrome" of the error detection decoder. The syndrome corresponds to the "remainder" of the 144 bit data word after it has been decoded by the generator polynomial G(x) and provides an indication of the occurrence and location of data errors, if any. In the present invention the syndrome also conveys the track number Ta and information as to its probable validity.

The Ta data is recovered at the end of each line by means of output terminals 804 which are connected directly to the outputs of the last five stages (FF-16 through FF-20) of FSR 802. The data error signal for player controller 622 is produced by means of NOR gate 840 having inputs connected to the true (Q) outputs of the first 15 stages (Q1 through Q15) of FSR 802. If, at the end of a data line, any output of stages 1-15 is high, the output of gate 840 will be low signifying a probable error in the Ta data. This inhibits processing of the Ta data in controller 622 as previously mentioned. The "all zero" condition for data error detection is by way of example only. It will be appreciated that a generator polynomial and suitable initial conditions for encoding and decoding may be selected such that stages 1-15 may contain a constant rather than all zeros to signify correct data transmission if desired (the "constant" if used, should be subtracted from the FSR 802 data during transfer of the "syndrome" to register 850).

From the foregoing, it is seen that stages 1-15 of FSR 802 contain a residue or "remainder" at the end of each data line which signifies the validity of the Ta (received) tracking information. Stages 16-20 contain a remainder which corresponds to the value of the Ta data.

The remaining elements of the decoder provide burst error correction of the audio data. During decoding, the output signals of stages Q1-Q15 of register 802 are applied to the first fifteen stages (FF1-FF15) of another 20 bit register 850. The remaining 5 bits (Q16-Q20) are applied in parallel via exclusive-OR gates 830-838 to the inputs of the corresponding stages of another 20 bit FSR 850. The expected track number Te applied to terminals 820 is subtracted from the recovered Ta data by means of gates 830-838. The locations in the audio data bit stream of errors are identified by means of an AND gate 856 having one input connected to the output of stage 20 of FSR 850 and another input connected to the output of an NOR gate 854 which, in turn, has inputs connected to the outputs (Q1-Q15) of the first 15 stages of the register. Errors are signified by a high output for gate 856. Errors are corrected by means of an exclusive OR gate 860 which inverts the delayed audio line data to the output of register 806 each time the output of gate 856 is high. The decoded and error corrected audio signal is then transferred to de-multiplex unit 638 where the L and R digital signals are separated and then converted to baseband analog audio signals by means of converters 640 and 642.

Figure 9:
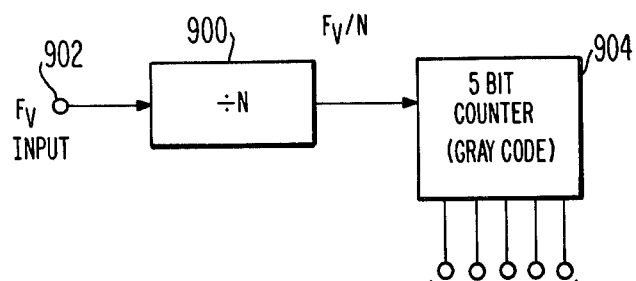
FIG. 9 is a block diagram illustrating an alternative form of track number generator suitable for use in the recording system of FIG. 3.

The alternative track number generator of FIG. 9 comprises a divider 900 having an input 902 for receiving field rate pulses Fv and an output for supplying divided pulses Fv/N to a 5 bit counter 904 which, preferrably, is of a type which counts in Gray code. Output terminals 906 of the counter provide a partial track identification number suitable for use in the encoding system of the invention. For digital audio discs having 8 pseudo-video fields per convolution of the information track, the number N should be equal to 8. This method of partial track number generation eliminates the need for DAXI encoding and therefore provides additional lines for conveying digital audio data. Nevertheless, DAXI encoding (and decoding) is preferrable because it gives an absolute track number (e.g., 18 bits) which may be used for program time keeping and editing or cueing purposes in addition to providing an error checked source of expected partial track numbers. Suitable DAXI processors (such as the one use in the RCA model SFT-100 video disc player) are commercially available.

What is claimed is:

1. A method for encoding an audio signal in a pseudo-video format to convey track information simultaneously with the audio signal on a line-by-line basis, comprising the steps of:
   (a) digitizing said audio signal to form sequential fields of digital data lines;
   (b) encoding each data line in an error correction encoder to form an encoded data signal;
   (c) generating a track identification number;
   (d) initializing said encoder to a given initial condition corresponding to said track identification number prior to encoding each data line; and
   (e) incrementing said track identification number at predetermined intervals related to a multiple of the field rate of said encoded data signal.

2. The method recited in claim 1 wherein said track identification number is repeated on a periodic basis during encoding of said audio signal.

3. The method recited in claim 1 further comprising the step of encoding said track identification number during a selected line of the vertical interval of a selected field of said encoded data signal to provide a source of redundant track identification information.

4. The method recited in claim 1 wherein said track identification is generated by the steps of dividing a selected synchronizing signal by a constant and dividing the resultant signal by a further constant selected such that the track identification number repeats on a periodic basis.

5. The method recited in claim 1 wherein the step of initialization of said encoder comprises entering only selected bits of said track identification number into a register of said encoder.

6. The method recited in claim 5 wherein the selected bits are in a Gray code format.

7. The method recited in claim 5 wherein the selected bits are entered in serial fashion.

8. The method recited in claim 5 wherein the selected bits are entered in parallel fashion.

9. The method recited in claim 1 wherein the track identification number is changed every eight fields.

10. Playback apparatus for a digital audio disc record of a type in which audio information is recorded in digital form in a pseudo-video format, each line of digital audio data being encoded by an error check encoder of a type in which the encoder initial state prior to encoding a data line is representative of a specified number of bits of a track number, said apparatus comprising:
    (a) means for recovering the encoded digital data lines from said disc record;
    (b) decoder means responsive to each data line for providing an error corrected digital audio data output signal;
    (c) initialization means for placing said decoder means in an initial state prior to decoding which corresponds to an expected track number;
    (d) circuit means for recovering a track number from the final state of said decoder means subsequent to decoding each data line; and
    (e) control means responsive to the expected and recovered track numbers for effecting track error correction.

11. Apparatus as recited in claim 10 wherein said initialization means includes means for deriving said expected track number from an auxiliary information code conveyed during the vertical interval of the digital audio signal recorded on said disc.

12. Apparatus as recited in claim 10 wherein said initialization means includes means for deriving said expected track number from previous track numbers recovered from said digital audio signal.

13. Apparatus as recited in claim 10 wherein said initialization means includes means for serially transferring said expected track number to an input of said encoder means.

14. Apparatus as recited in claim 10 wherein said initialization means includes means for transferring said expected track number to parallel input means of said decoder means.

15. Apparatus as recited in claim 10 wherein said decoder means includes an output for providing an indicator signal representative of probable error in the recovered track number and further comprising means for applying said indicator signal to an input of said control means to interrupt track error correction.

* * * * *